US010082044B2

(12) United States Patent
Kawashima et al.

(10) Patent No.: US 10,082,044 B2
(45) Date of Patent: Sep. 25, 2018

(54) TURNING APPARATUS (71) Applicant: MITSUBISHI HEAVY INDUSTRIES COMPRESSOR CORPORATION, Tokyo (JP)

(72) Inventors: Hirokazu Kawashima, Hiroshima (JP); Masataka Yamada, Hiroshima (JP); Manu Agarwal, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 13 days.

(21) Appl. No.: 15/503,290

(22) PCT Filed: Nov. 5, 2014

(86) PCT No.: PCT/JP2014/079340
§ 371 (c)(1),
(2) Date: Feb. 10, 2017

(87) PCT Pub. No.: WO2016/071970
PCT Pub. Date: May 12, 2016

(65) Prior Publication Data
US 2017/0226899 A1 Aug. 10, 2017

(51) Int. Cl.
*F16H 57/00* (2012.01)
*F01D 25/36* (2006.01)
(Continued)

(52) U.S. Cl.
CPC .............. *F01D 25/36* (2013.01); *F16H 3/34* (2013.01); *F16H 35/18* (2013.01); *H02K 7/116* (2013.01)

(58) Field of Classification Search
CPC ............ F01D 25/36; F16H 3/34; F16H 35/18; H02K 7/116
See application file for complete search history.

(56) References Cited

U.S. PATENT DOCUMENTS 2,910,894 A * 11/1959 Kenney ................... F01D 25/36
74/8
3,021,719 A * 2/1962 Conrad, Jr. ............. F01D 25/36
477/19
(Continued)

FOREIGN PATENT DOCUMENTS

JP          61-91002 U      6/1986
JP          3201749 B2      8/2001
JP       2012-177328 A      9/2012

OTHER PUBLICATIONS

International Search Report dated Feb. 3, 2015 in PCT Application No. PCT/JP2014/079340 with an English Translation.
(Continued)

*Primary Examiner* — William J Cook
(74) *Attorney, Agent, or Firm* — Birch, Stewart, Kolasch & Birch, LLP (57) ABSTRACT

A turning apparatus (30) includes an electric motor (41), a moving gear (53) that is movable between a first position at which rotation of an output shaft (43) of the electric motor (41) is able to be transmitted to a rotor (11), and a second position and a third position, which are different from each other and at which rotation of the output shaft (43) is unable to be transmitted to the rotor (11), a movement mechanism (60) configured to move the moving gear (53) between the first position, the second position and the third position, and a control device (61) configured to control the movement mechanism (60) based on a retreat signal such that the moving gear (53) is moved from the first position to the second position and control the movement mechanism (60) based on an adhesion prevention signal such that the moving gear (53) reciprocates between the second position and the third position.

3 Claims, 4 Drawing Sheets (51) Int. Cl.
*F16H 35/18* (2006.01)
*H02K 7/116* (2006.01)
*F16H 3/34* (2006.01)

(56) References Cited

U.S. PATENT DOCUMENTS

| | | | | |
|---|---|---|---|---|
| 3,919,894 | A | * | 11/1975 | Keeter ................... F01D 25/36 |
| | | | | 60/788 |
| 4,643,637 | A | * | 2/1987 | Strickler ................ F01D 25/36 |
| | | | | 415/123 |
| 6,070,482 | A | * | 6/2000 | Kugio ...................... F16H 3/34 |
| | | | | 74/354 |
| 2015/0053029 | A1 | * | 2/2015 | Sasaki .................... F01D 25/34 |
| | | | | 74/384 |
| 2017/0226899 | A1 | * | 8/2017 | Kawashima ............ F01D 25/36 |

OTHER PUBLICATIONS

Written Opinion dated Feb. 3, 2015 in PCT Application No. PCT/JP2014/079340 with an English Translation.

* cited by examiner

TURNING APPARATUS

TECHNICAL FIELD

The present invention relates to a turning apparatus for rotating a turbine rotor included in a steam turbine or the like.

BACKGROUND ART

For example, during shutdown of a steam turbine or the like used in a power plant or the like, when a turbine rotor is left in a non-rotation state at a high temperature, bending in the turbine rotor may occur due to distortion by heating generated in the turbine rotor due to a temperature difference generated in a turbine casing in association with a decrease in temperature of steam or a gas in the turbine or the weight of the turbine rotor. Here, in order to avoid the occurrence of bending in the turbine rotor of the steam turbine, during shutdown of the swam turbine and before starting the steam turbine, turning that rotates the turbine rotor for a predetermined time at a low speed should be performed. In order to perform such turning, a turning apparatus for rotating the turbine rotor using power of an electric motor is widely used.

In such a turning apparatus, as a driving gear is meshed with a wheel gear installed at the turbine rotor and the driving gear is rotated by the electric motor, the turning of the turbine rotor is performed. Here, When starting of the steam turbine is terminated, meshing between the driving gear of the turning apparatus and the wheel gear of the turbine rotor is released and the turning is terminated. For example, in Patent Literature 1, when the wheel gear is rotated more rapidly than the turning by the turning apparatus, the wheel gear pushes the driving gear out, and the meshing between the wheel gear and the driving gear is released. In addition, in Patent Literature 2, as a hydraulic cylinder connected to the driving gear is tilted in a direction away from the wheel gear, the meshing between the wheel gear and the driving gear is released.

CITATION LIST

Patent Literature

[Patent Literature 1]
Japanese Unexamined Patent Application, First Publication No. S61-91002
[Patent Literature 2]
Japanese Patent No. 3201749

SUMMARY OF INVENTION

Technical Problem

A steam turbine continues its operation for a long time once the operation is started. For this reason, during the operation of the steam turbine, the turning apparatus continues to be in a shutdown state for a long time until the operation of the steam turbine is subsequently stopped. When the turning apparatus is in the shutdown state for a long time, lubricating oil stuck to a driving gear of the turning apparatus, a lever configured to move the driving gear to the wheel gear, or the like, may be carbonized due to an influence of ambient heat or the like, and thus, the driving gear, the lever, or the like may be adhered. Accordingly, when the operation of the steam turbine is stopped and the turning apparatus is in operation, an influence such as a delay in an operation of the turning apparatus, inability of the turning, or the like, may occur. For this reason, when the driving gear, the lever, or the like, of the turning apparatus is adhered, cleaning, replacement, or the like, of the driving gear, the lever, or the like, is necessary, and a workload or costs applied to a repair of the turning apparatus is increased.

Solution to Problem

In order to solve the aforementioned problems, the present invention employs the following means.

According to a first aspect of the present invention, a turning apparatus includes an electric motor; a moving gear that is movable between a first position at which rotation of an output shaft of the electric motor is able to be transmitted to a rotor, and a second position and a third position, which are different from each other, at which rotation of the output shaft is unable to be transmitted to the rotor; a movement mechanism configured to move the moving gear between the first position, the second position and the third position; and a control device configured to control the movement mechanism based on a retreat signal such that the moving gear is moved from the first position to the second position and control the movement mechanism based on an adhesion prevention signal such that the moving gear reciprocates between the second position and the third position.

According to the above-mentioned configuration, when the turning is stopped and the rotor is driven, the control device moves the moving gear from the first position to the second position based on the retreat signal and rotation of the output shaft of the electric motor is not transmitted to the rotor. Here, when a state in which the moving gear is stopped at the second position is continued for a long time, attached substances may be adhered to the moving gear, the movement mechanism, or the like, and then, when the turning is performed, an influence such as a delay of an operation of the turning apparatus may occur. However, in the present invention, the control device moves the moving gear from the second position to the third position based on the adhesion prevention signal during stoppage of the turning. Accordingly, a stoppage state of the moving gear and the movement mechanism can be prevented from being continued for a long time. That is, the moving gear and the movement mechanism can be operated even during stoppage of the turning to suppress attached substances from being adhered thereto.

According to a second aspect of the present invention, in the first aspect, the third position is disposed between the first position and the second position.

According to the above-mentioned configuration, the moving gear moves within a range from the first position to the second position. For this reason, in moving the moving gear to the third position, there is no need to expand the moving range of the moving gear. For this reason, the configuration in which the moving gear is moved to the third position without varying the size of the turning apparatus can be employed. Accordingly, the turning apparatus including the configuration can be applied to the existing steam turbine and costs applied to modification or the like of the turning apparatus can be reduced.

Advantageous Effects of Invention

According to the turning apparatus of the present invention, adhesion of a moving gear, a movement mechanism or the like, during stoppage of turning can be suppressed.

DESCRIPTION OF EMBODIMENTS

First Embodiment

Hereinafter, a turning apparatus 30 according to a first embodiment of the present invention will be described with reference to FIGS. 1 to 3.

The turning apparatus 30 is, for example, an apparatus for rotating a turbine rotor 11 of a steam turbine (not shown) at a low speed.

In the embodiment, a wheel gear 12 integrally attached to an outer circumference of the turbine rotor 11 and a revolution number measurement instrument 13 configured to measure a revolution number of the turbine rotor 11 are provided at one end of the turbine rotor 11.

Figure 1:
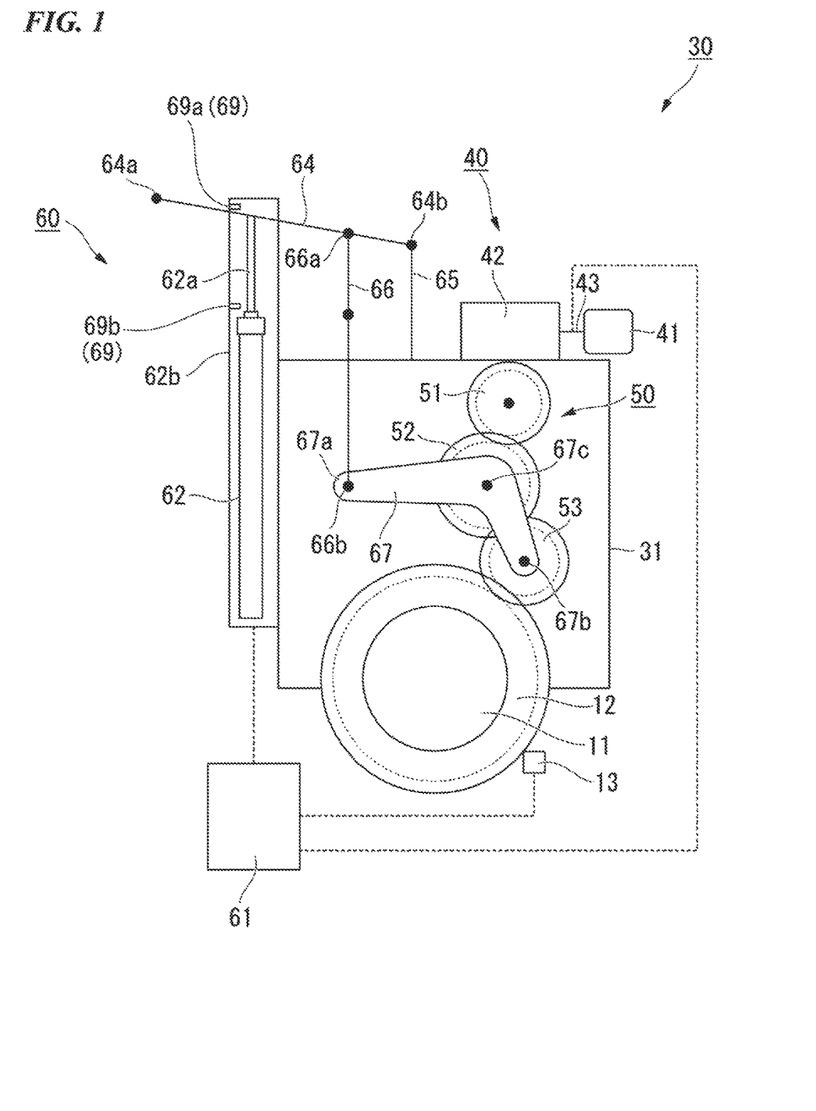
FIG. 1 is a cross-sectional view of a turning apparatus according to a first embodiment of the present invention, showing a state in which a moving gear is disposed at a first position.

As shown in FIG. 1, the turning apparatus 30 includes a casing 31, a power unit 40 and a power transmission unit 50. The turning apparatus 30 is disposed at one end of the turbine rotor 11.

In the embodiment, in FIG. 1, a left/right direction is referred to as a widthwise direction, an up/down direction is referred to as an up/down direction, and an axial direction of the turbine rotor 11 is referred to as an axial direction.

The power unit 40 includes an electric motor 41, an output shaft 43 configured to transmit a rotary driving force of the electric motor 41, and a speed reducer 42 configured to reduce the rotary driving force transmitted from the output shaft 43 at a predetermined speed ratio (speed reduction ratio). In the embodiment, the power unit 40 is disposed at an upper surface of the casing 31.

The power transmission unit 50 includes an output gear 51, a connecting gear 52 and a moving gear 53. In the embodiment, the power transmission unit 50 is disposed in the casing 31.

A belt (not shown) spans from the speed reducer 42 to the output gear 51, and thus, a rotary driving force is transmitted.

The connecting gear 52 is disposed to be meshed with the output gear 51, below the output gear 51. When the output gear 51 is rotated by the rotary driving force from the power unit 40, the connecting gear 52 is also rotated therewith.

The moving gear 53 is disposed to be meshed with the connecting gear 52, below the connecting gear 52. The moving gear 53 is rotated with rotation of the connecting gear 52.

Figure 2:
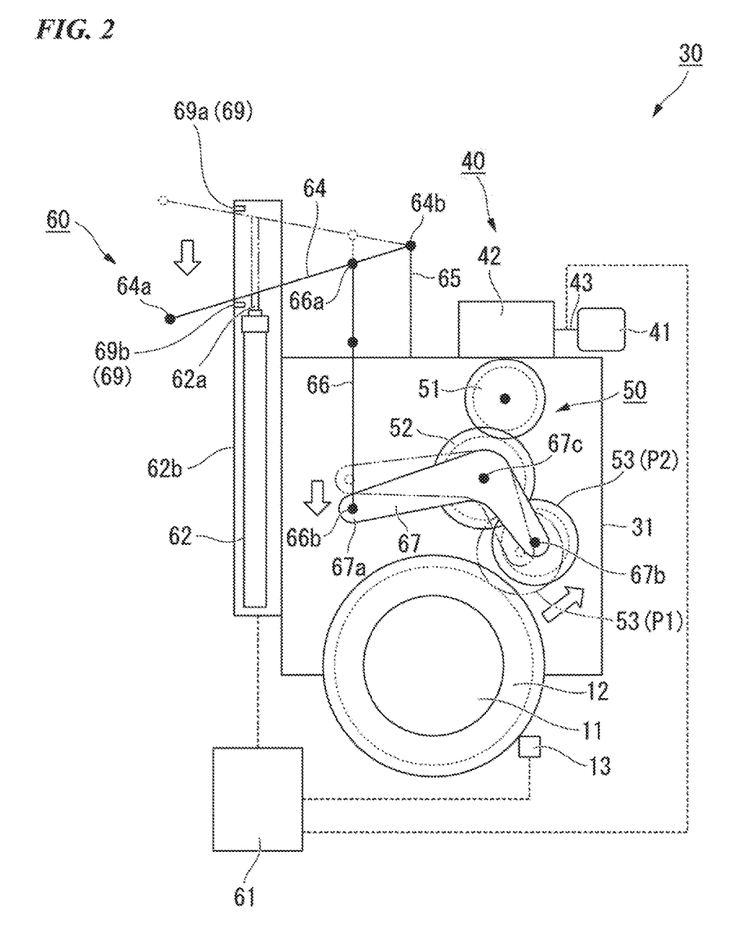
FIG. 2 is a cross-sectional view of the turning apparatus according to the first embodiment of the present invention, showing a state in which the moving gear is disposed at a second position.
Figure 3:
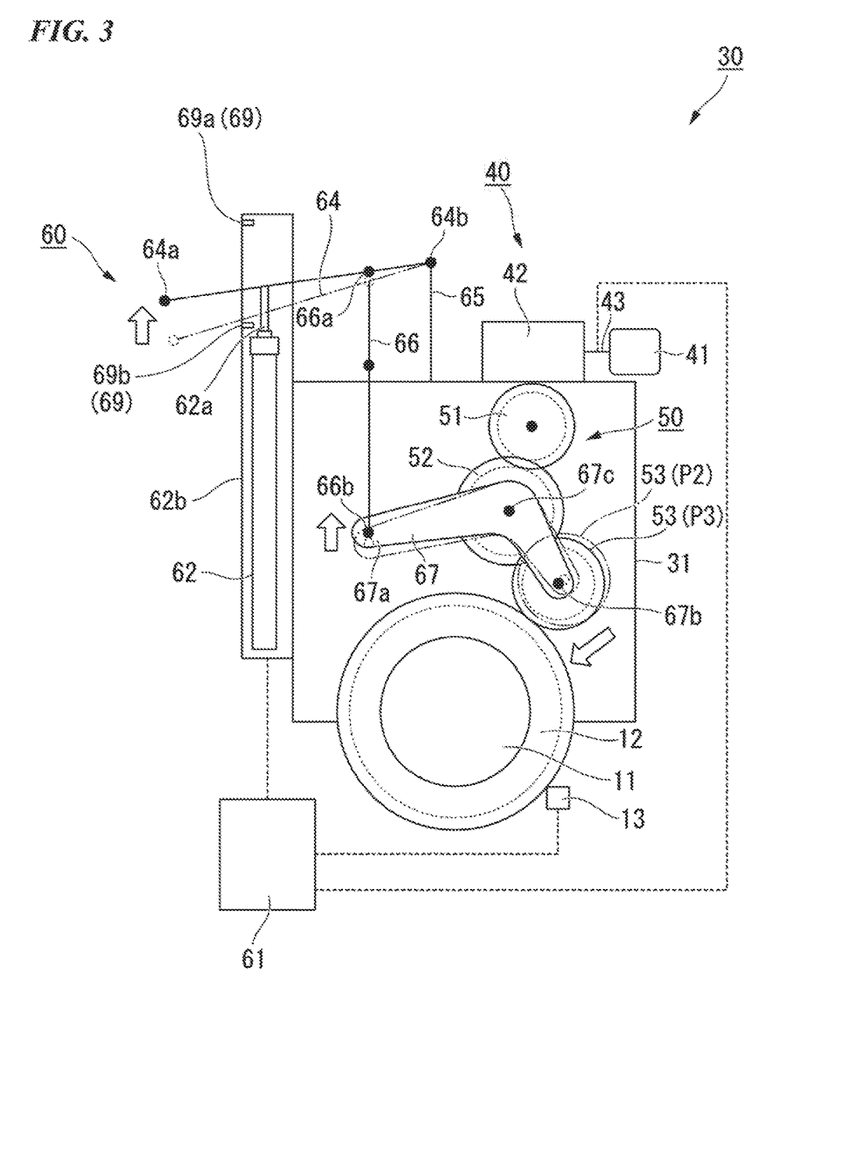
FIG. 3 is a cross-sectional view of the turning apparatus according to the first embodiment of the present invention, showing a state in which the moving gear is disposed at a third position.

In addition, as shown in FIGS. 2 and 3, the moving gear 53 is configured to be movable between a first position P1, a second position P2 and a third position P3 by a movement mechanism 60, which will be described below. The first position P1 is a position meshed with the wheel gear 12 (a position shown by a broken line in FIGS. 2 and 3). The second position P2 is a position, at which meshing with the wheel gear 12 is released, separated from the wheel gear 12 toward the outside in the radial direction (a position shown by a solid line in FIG. 2). The third position P3 is a position, at which meshing with the wheel gear 12 is released, separated from the wheel gear 12 toward the outside in the radial direction. In the embodiment, the third position P3 is disposed between the first position P1 and the second position P2 (a position shown by a solid line in FIG. 3).

The moving gear 53 is meshed with the wheel gear 12 of the turbine rotor 11 to rotate the wheel gear 12 using the rotary driving force transmitted from the power unit 40 when disposed at the first position P1. The turning apparatus 30 rotates the turbine rotor 11 by rotating the wheel gear 12. In addition, since the meshing between the moving gear 53 and the wheel gear 12 of the turbine rotor 11 is released when the moving gear 53 is disposed at the second position P2 and the third position P3, the rotary driving force transmitted from the power unit 40 is not transmitted to the wheel gear 12.

As shown in FIG. 1, the movement mechanism 60 includes a control device 61, an air cylinder 62, a lever 64, a movement rod 66 and a bracket 67.

In addition, in the embodiment, the air cylinder 62 includes a proximity switch 69. The proximity switch 69 has a first proximity switch 69a (first position detection) configured to detect that the moving gear 53 is disposed at the first position P1, and a second proximity switch 69b (second position detection) configured to detect that the moving gear 53 is disposed at the second position P2.

In the embodiment, the control device 61 controls the air cylinder 62 to move the moving gear 53 to the first position P1, the second position P2 and the third position P3.

When turning is performed, the control device 61 receives a proximity signal and controls an electromagnetic valve (not shown) installed at a supply and discharge pipe (not shown) which is configured to supply and discharge driving air to and from the air cylinder 62. Accordingly, the control device 61 controls the air cylinder 62 to move the moving gear 53 from the second position P2 (the position of the solid line in FIG. 2) to the first position P1 (the position of the broken line in FIG. 2). Here, the arrival of the moving gear 53 at the first position P1 is detected by the first proximity switch 69a, and the first proximity switch 69a is turned ON. When the first proximity switch 69a is turned ON, the turning apparatus 30 operates the electric motor 41. Accordingly, the turning apparatus 30 starts turning.

In the control device 61, when the steam turbine starts, as the moving gear 53 is kicked out in the radial direction of the turbine rotor 11 by a driving force of the turbine rotor, the first proximity switch 69a configured to detect that the moving gear 53 is disposed at the first position P1 is turned OFF. As the first proximity switch 69a is turned OFF, the control device 61 determines that the turning is terminated and stops the turning. When the turning is stopped, the control device 61 receives a retreat signal and controls the electromagnetic valve (not shown) installed at the supply and discharge pipe (not shown) which is configured to supply and discharge driving air to and from the air cylinder 62. Accordingly, the control device 61 controls the air cylinder 62 to move the moving gear 53 from the first position P1 (the position of the broken line in FIG. 2) to the second position P2 (the position of the solid line in FIG. 2).

Here, the arrival of the moving gear 53 at the second position P2 is detected by the second proximity switch 69b, and the second proximity switch 69b is turned ON. The second proximity switch 69*b* feedbacks the fact that the second proximity switch 69*b* is turned ON to the control device 61.

In addition, during stoppage of the turning, the control device 61 receives an adhesion prevention signal and controls the electromagnetic valve (not shown) installed at the supply and discharge pipe (not shown) which is configured to supply and discharge driving air to and from the air cylinder 62. Accordingly, the control device 61 controls the air cylinder 62 to move the moving gear 53 from the second position P2 (the position of the broken line in FIG. 3) to the third position P3 (the position of the solid line in FIG. 3).

The air cylinder 62 is a power source configured to move the moving gear 53 to any one position of the first position P1, the second position P2 and the third position P3 according to control of the control device 61. In the embodiment, the air cylinder 62 is installed at an outer side surface of one side in a widthwise direction of the casing 31.

The air cylinder 62 has a piston rod 62*a* slidably extending in the up/down direction, and an air cylinder case 62*b* configured to house the piston rod 62*a*. The driving air is supplied and discharged to and from the air cylinder 62 by the supply and discharge pipe (not shown) via the electromagnetic valve (not shown). The air cylinder 62 is configured such that a stroke in the up/down direction of the piston rod 62*a* is varied by changing a supply and discharge amount of the driving air through the electromagnetic valve. In the embodiment, the air cylinder 62 is configured to be driven in two strokes, i.e., a stroke for moving the moving gear 53 between the first position P1 and the second position P2, and a stroke for moving the moving gear 53 between the second position P2 and the third position P3.

An upper end portion of the piston rod 62*a* extends to a position above the upper surface of the casing 31 and is connected to a first end 64*a* side of the lever 64 extending in the widthwise direction. In addition, a slit through which the lever 64 is inserted is formed in the up/down direction in a side surface in the widthwise direction of the air cylinder case 62*b*.

A second end 64*b* of the lever 64 is tiltably supported by a support section 65 formed at the upper surface of the casing 31. For this reason, as the piston rod 62*a* of the air cylinder 62 slides in the up/down direction, the first end 64*a* of the lever 64 connected to the piston rod 62*a* is moved in the up/down direction using the second end 64*b* of the lever 64 supported by the support section 65 as a support point.

The movement rod 66 extends in the up/down direction, and an upper end 66*a* is tiltably connected at a position above the upper surface of the casing 31 between a position, at which the lever 64 and the piston rod 62*a* are connected, and the second end 64*b* of the lever 64. In addition, a lower end 66*b* side of the movement rod 66 is inserted into the casing 31. The movement rod 66 moves in the up/down direction in connection with the tilting of the lever 64 according to sliding movement of the piston rod 62*a* of the air cylinder.

The bracket 67 is a plate-shaped member formed in substantially an L shape. A first end 67*a* of the bracket 67 is tiltably connected to the lower end 66*b* of the movement rod 66. In addition, a second end 67*b* of the bracket 67 is connected to a central shaft of the moving gear 53, and an intermediate section 67*c* is connected to a central shaft of the connecting gear 52. For this reason, in the bracket 67, according to movement in the up/down direction of the movement rod 66, the first end 67*a* is moved in the up/down direction and the second end 67*b* is moved in the radial direction of the wheel gear 12 using the intermediate section 67*c* as a support point.

For example, as shown in FIG. 2, in the case in which the moving gear 53 is disposed at the first position P1, the control device 61 receives a retreat signal by turning OFF the first proximity switch 69*a* configured to detect that the moving gear 53 is disposed at the first position P1, the control device 61 controls the electromagnetic valve (not shown) and supplies and discharges the driving air such that the piston rod 62*a* of the air cylinder 62 is moved in the downward direction. The piston rod 62*a* moves the movement rod 66 in the downward direction together with the lever 64. When the movement rod 66 is moved in the downward direction, the first end 67*a* of the bracket 67 is moved in the downward direction and the second end 67*b* of the bracket 67 is moved toward the outside in the radial direction of the wheel gear 12 using the intermediate section 67*c* of the bracket 67 as a support point. Here, since the second end 67*b* of the bracket 67 is connected to the central shaft of the moving gear 53, the moving gear 53 is also moved toward the outside in the radial direction of the wheel gear 12 (the second position P2). Here, the arrival of the moving gear 53 at the second position P2 is detected by the second proximity switch 69*b*, and the second proximity switch 69*b* is turned ON. The second proximity switch 69*b* feedbacks the fact that the second proximity switch 69*b* is turned ON to the control device 61.

In addition, as shown in FIG. 2, in the case in which the moving gear 53 is disposed at the second position P2, when the control device 61 receives the proximity signal, the control device 61 controls the electromagnetic valve (not shown) and supplies and discharges the driving air such that the piston rod 62*a* of the air cylinder 62 is moved in the upward direction. The piston rod 62*a* moves the movement rod 66 in the upward direction together with the lever 64. When the movement rod 66 is moved in the upward direction, the first end 67*a* of the bracket 67 is moved in the upward direction and the second end 67*b* of the bracket 67 is moved toward the inside in the radial direction of the wheel gear 12 using the intermediate section 67*c* of the bracket 67 as a support point. Here, since the second end 67*b* of the bracket 67 is connected to the central shaft of the moving gear 53, the moving gear 53 is also moved toward the inside in the radial direction of the wheel gear 12 (the second position P2).

Further, as shown in FIG. 3, when the moving gear 53 is disposed at the second position P2, the control device 61 receives the adhesion prevention signal and controls the electromagnetic valve (not shown) and supplies and discharges the driving air such that the piston rod 62*a* of the air cylinder 62 is moved in the upward direction. The piston rod 62*a* moves the movement rod 66 in the upward direction together with the lever 64. When the movement rod 66 is moved in the upward direction, the first end 67*a* of the bracket 67 is moved in the upward direction and the second end 67*b* of the bracket 67 is moved toward the inside in the radial direction of the wheel gear 12 using the intermediate section 67*c* of the bracket 67 as a support point. Here, since the second end 67*b* of the bracket 67 is connected to the central shaft of the moving gear 53, the moving gear 53 is also moved toward the inside in the radial direction of the wheel gear 12 (the third position P3). Here, as the second proximity switch 69*b* detects that the moving gear 53 is disposed at the second position P2 is turned OFF, the second proximity switch 69*b* feedbacks the fact that the moving gear 53 is separated from the second position P2 to the control device 61.

Next, an operation of the turning apparatus 30 will be described with reference to FIGS. 1 to 3.

First, in a state before starting the turning, the moving gear 53 is disposed at the second position P2 (the position of the solid line in FIG. 2). When the turning is started to operate the steam turbine, the control device 61 receives the proximity signal and controls the electromagnetic valve (not shown), and the driving air is supplied and discharged to and from the air cylinder 62. Accordingly, the air cylinder 62 pushes up and tilts the lever 64, and the movement rod 66 and the bracket 67 are pushed down. In this way, the moving gear 53 connected to the second end 67*b* of the bracket 67 is moved from the second position P2 (the position of the solid line in FIG. 2) to the first position P1 (the position of the broken line in FIG. 2). Here, the arrival of the moving gear 53 at the first position P1 is detected by the first proximity switch 69*a*, and the first proximity switch 69*a* is turned ON. When the first proximity switch 69*a* is turned ON, the turning apparatus 30 drives the electric motor 41.

Further, it should be noted that the control device 61 may generate the proximity signal when the turning is started and proximity signal may be transmitted to the control device 61. In addition, the proximity signal may be transmitted to the control device 61 from the outside by an operation of an operator.

During the turning, the control device 61 acquires the revolution number of the turbine rotor 11 measured by the revolution number measurement instrument 13 at predetermined intervals. A rotary driving force of the electric motor 41 is transmitted to the speed reducer 42 through the output shaft 43, and the revolution number is decreased at a predetermined speed ratio (speed reduction ratio) in the speed reducer 42. In this way, the power unit 40 outputs the rotary driving force to the output gear 51 of the power transmission unit 50.

The output gear 51 starts rotating by the rotary driving force transmitted from the speed reducer 42, and the connecting gear 52 meshed with the output gear 51 is rotated. Accordingly, the moving gear 53 meshed with the connecting gear 52 also starts to rotate.

Here, the moving gear 53 is disposed at the first position P1, and the first proximity switch 69*a* is turned ON. That is, the moving gear 53 is meshed with the wheel gear 12 of the turbine rotor 11. For this reason, as the moving gear 53 is rotated, the turbine rotor 11 also starts to rotate with the wheel gear 12.

Next, upon starting the steam turbine, the control device 61 receives a retreat signal when the moving gear 53 is kicked out in the radial direction of the turbine rotor 11 and the first proximity switch 69*a* that detects the moving gear 53 is disposed at the first position P1 is turned OFF. The control device 61, upon receiving the retreat signal, controls the electromagnetic valve (not shown), and the driving air is supplied and discharged to and from the air cylinder. Accordingly, as shown in FIG. 2, the air cylinder 62 pushes down the lever 64 and the movement rod 66 to tilt the bracket 67. In this way, the moving gear 53 connected to the second end 67*b* of the bracket 67 is moved from the first position P1 (the position of the broken line in FIG. 2) to the second position P2 (the position of the solid line in FIG. 2). When the second proximity switch 69*b* detects that the moving gear 53 is disposed at the second position P2, the second proximity switch 69*b* is turned ON.

Further, the control device 61 determines whether the turning is terminated based on a state of the first proximity switch 69*a* configured to detect that the moving gear 53 is disposed at the first position P1 or the revolution number of the turbine rotor 11 measured by the revolution number measurement instrument 13. For example, the control device 61 may determine that the turning is terminated when the control device 61 detects that the first proximity switch 69*a* is turned OFF. In addition, the control device 61 may determine that the turning is terminated when the revolution number of the turbine rotor 11 exceeds a predetermined value.

In addition, when the turning is determined to be terminated, the control device 61 generates the retreat signal, and the retreat signal may be transmitted to the control device 61 itself. In addition, the retreat signal may be transmitted to the control device 61 from the outside by the operation of the operator.

After the moving gear 53 is moved to the second position P2, the turning apparatus 30 stops rotation of the electric motor 41 to stop the turning.

During stoppage of the turning, the control device 61 receives the adhesion prevention signal and controls the electromagnetic valve (not shown) and supplies and discharges the driving air to and from the air cylinder 62. Accordingly, as shown in FIG. 3, the air cylinder 62 pushes the lever 64 and the movement rod 66 up to tilt the bracket 67. In this way, the moving gear 53 connected to the second end 67*b* of the bracket 67 is moved from the second position P2 (the position of the broken line in FIG. 3) to the third position P3 (the position of the solid line in FIG. 3). Here, the second proximity switch 69*b* configured to detect that the moving gear 53 is disposed at the second position P2 is turned OFF, the second proximity switch 69*b* feedbacks the fact that the moving gear 53 is separated from the second position P2 to the control device 61.

Further, the control device 61 generates an adhesion prevention signal when an elapsed predetermined time is detected by a timer (not shown), and the adhesion prevention signal may be transmitted to the control device 61 itself. Here, the control device 61 may determine whether a predetermined time has elapsed since the second proximity switch 69*b* was turned ON. In addition, the control device 61 may cause the adhesion prevention signal to be transmitted to the control device 61 from the outside by the operation of the operator.

After the moving gear 53 arrives at the third position P3, the control device 61 receives the retreat signal and controls the electromagnetic valve (not shown) such that the air cylinder 62 moves the moving gear 53 to the second position P2 again. Here, when the control device 61 is configured to generate the retreat signal, the control device 61 may generate the retreat signal immediately after the moving gear 53 arrives at the third position P3 and may generate the retreat signal when an elapsed predetermined time is determined by the timer. In addition, the retreat signal may be transmitted to the control device 61 from the outside by the operation of the operator. When the moving gear 53 arrives at the second position P2, the second proximity switch 69*b* is turned ON.

When the turning starts again to stop the steam turbine, like the above-mentioned description, the control device 61 receives the proximity signal and controls the electromagnetic valve (not shown) and supplies and discharges the driving air to and from the air cylinder 62. Accordingly, the air cylinder 62 pushes up and tilts the lever 64, and the movement rod 66 and the bracket 67 are pushed down. In this way, the moving gear 53 connected to the second end 67b of the bracket 67 is moved from the second position P2 or the third position P3 to the first position P1.

Next, an effect of the turning apparatus 30 according to the embodiment will be described.

According to the above-mentioned turning apparatus 30, during stoppage of the turning, the control device 61 controls the moving gear 53 to move between the second position P2 and the third position P3 when the adhesion prevention signal is received. That is, as the moving gear 53 and the movement mechanism 60 configured to move the moving gear 53 are operated, a state in which the moving gear 53 and the movement mechanism 60 are stopped during stoppage of the turning can be prevented from being continued for a long time. For this reason, attached substances can be suppressed from being adhered to the moving gear 53 and the movement mechanism 60 during stoppage of the turning.

According to the above-mentioned turning apparatus 30, the control device 61 controls the moving gear 53 to be moved between the second position P2 and the third position P3 when the adhesion prevention signal is received. For this reason, even when a period during stoppage of the turning is continued for a long time, since the control device 61 moves the moving gear 53 based on the adhesion prevention signal, the state in which the moving gear 53 and the movement mechanism 60 are stopped can be prevented from being continued for a long time. Accordingly, attached substances can be suppressed from being adhered to the moving gear 53 and the movement mechanism 60 during stoppage of the turning. In addition, when the control device 61 is configured to receive the adhesion prevention signal at every passage of a predetermined time by the timer (not shown), labor due to operator manipulations can be reduced.

According to the above-mentioned turning apparatus 30, since the third position P3 is disposed between the first position P1 and the second position P2, the moving gear 53 moved in a range from the first position P1 to the second position P2. For this reason, in moving the moving gear 53 to the third position P3, there is no need to expand the moving range of the moving gear 53. For this reason, a configuration of moving the moving gear 53 to the third position P3 without varying the size of the turning apparatus 30 can be employed. Accordingly, the turning apparatus 30 including the above-mentioned configuration can be applied to the steam turbine or the like of the related art and costs applied to modification or the like of the turning apparatus 30 can be reduced.

Second Embodiment

Next, a turning apparatus 30 according to a second embodiment of the present invention will be described with reference to FIG. 4

The same components as the first embodiment are designated by the same reference numerals and detailed description thereof will be omitted. The embodiment is distinguished from the first embodiment in that the air cylinder 62 has a mechanical stopper 68.

Figure 4:
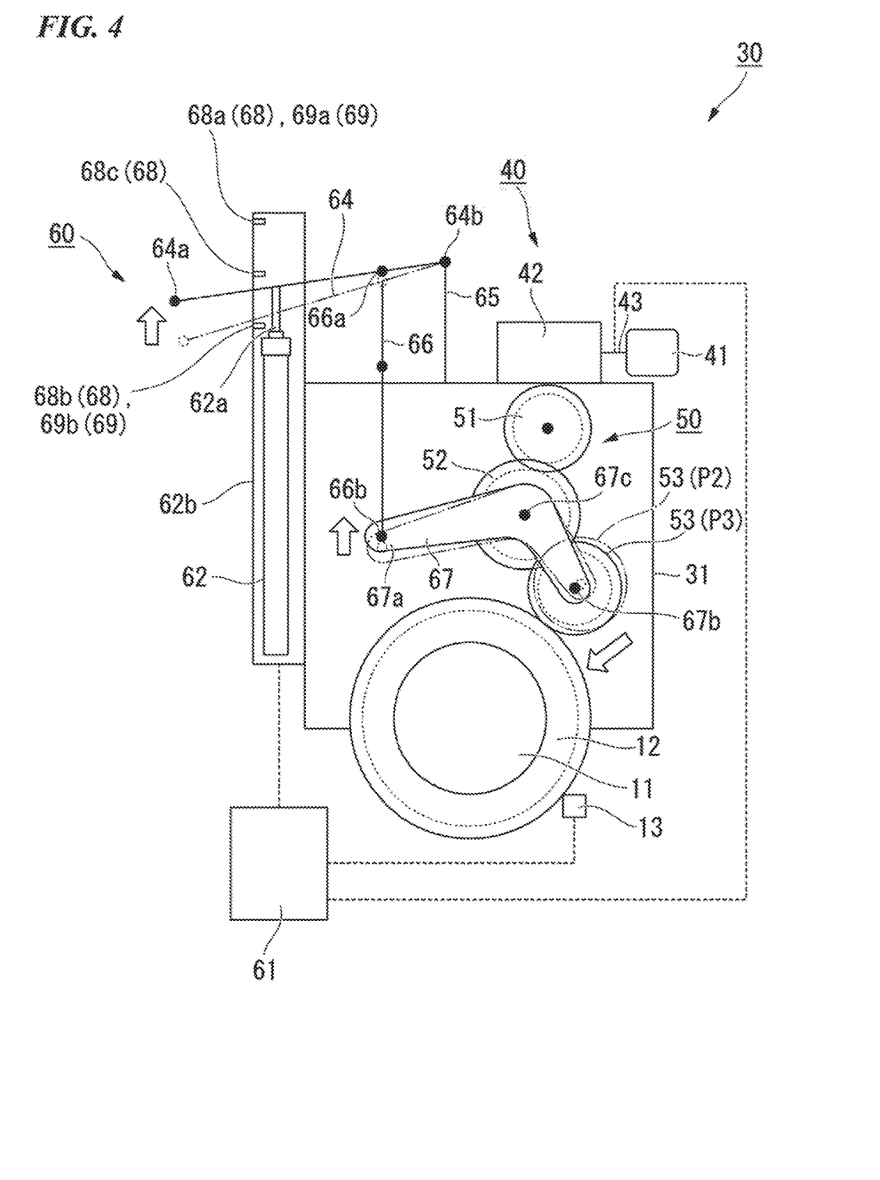
FIG. 4 is a cross-sectional view of a turning apparatus according to a second embodiment of the present invention.

In the embodiment, as shown in FIG. 4, since the moving gear 53 is suppressed from colliding with the wheel gear 12 or the inner wall of the casing 31, the mechanical stopper 68 configured to restrict tilting in the up/down direction of the lever 64 is installed at the slit of the air cylinder ease 62b. The mechanical stopper 68 has a first mechanical stopper 68a configured to restrict tilting in the upward direction of the lever 64, and a second mechanical stopper 68b configured to restrict tilting in the downward direction. The first mechanical stopper 68a is installed at a position corresponding to the first position P1 of the moving gear 53, and the second mechanical stopper 68b is installed at a position corresponding to the second position P2 of the moving gear 53. In the embodiment, the mechanical stopper 68 further includes a third mechanical stopper 68c installed between the first mechanical stopper 68a and the second mechanical stopper 68b. The third mechanical stopper 68c is installed at a position corresponding to the third position P3 of the moving gear 53.

The third mechanical stopper 68c is formed as a plate-shaped member that is slidable in the axial direction, and when the moving gear 53 is moved between the first position P1 and the second position P2, is retracted to a position, at which the slit is not blocked, serving as one side in the axial direction from the slit of the air cylinder case 62b such that movement in the up/down direction of the lever 64 is not restricted. When the moving gear 53 is moved between the second position P2 and the third position P3, the third mechanical stopper 68c is slid toward the other side in the axial direction and disposed at a position at which the third mechanical stopper 68c blocks (crosses) the slit of the air cylinder case 62b in the axial direction such that movement of the lever 64 in the downward direction is restricted.

When the turning is started and stopped, the third mechanical stopper 68c is retracted to one side in the axial direction so as not to block the slit of the air cylinder case 62b.

During stoppage of the turning, when the control device 61 receives the adhesion prevention signal, the third mechanical stopper 680 is slid to the other side in the axial direction. Accordingly, the third mechanical stopper 68c is disposed to block the slit of the air cylinder case 62b in the axial direction. As a result, the lever 64 is restricted from being moved in the downward direction farther than a predetermined position, i.e., a position corresponding to the third position P3 of the moving gear 53.

After the third mechanical stopper 68c blocks the slit of the air cylinder case 62b, like the first embodiment, the control device 61 controls the air cylinder 62 such that the moving gear 53 is moved between the second position P2 and the third position P3.

The control device 61 slides the third mechanical stopper 68c to the one side in the axial direction to be retracted from above the slit of the air cylinder case 62b when movement of the moving gear 53 between the second position P2 and the third position P3 is terminated.

According to the above-mentioned turning apparatus 30, the mechanical stopper 68 (68a, 68b and 68c) is formed at the slit of the air cylinder case 62b. Accordingly, since movement of the lever 64 in the up/down direction is restricted, the moving gear 53 can be suppressed from moving toward the inside in the radial direction of the wheel gear 12 beyond the first position P1 or moving toward the outside in the radial direction of the wheel gear 12 beyond the second position P2. For this reason, the moving gear 53 can be suppressed from colliding with the wheel gear 12 or the inner wall of the casing 31.

According to the above-mentioned turning apparatus 30, during stoppage of the turning, the control device 61 slides the third mechanical stopper 68c to the other side in the axial direction when the adhesion prevention signal is received. Accordingly, the third mechanical stopper 68c is disposed to block the slit of the air cylinder case 62b in the axial direction. For this reason, the moving gear 53 can be restricting from being moved toward the inside in the radial direction of the wheel gear 12 further than the third position P3 by restricting movement of the lever 64 in the downward direction. According to the above-mentioned configuration, the moving gear 53 can be suppressed from being moved to the first position P1 during stoppage of the turning, and the moving gear 53 can be safely moved during stoppage of the turning.

In the embodiment, while the configuration in which the third mechanical stopper 68*c* is slid toward the other side in the axial direction when the control device 61 receives the adhesion prevention signal is provided, it is not limited thereto. The third mechanical stopper 68*c* may be slid toward the other side in the axial direction when the control device 61 receives the retreat signal, and the third mechanical stopper 68*c* may be slid toward the one side in the axial direction when the control device 61 receives the proximity signal. In addition, the position of the third mechanical stopper 68*c* may be manually moved by the operator.

Further, the third mechanical stopper 68*c* may have any configuration as long as movement of the lever 64 can be restricted, for example, a wedge-shaped key may be plugged into the slit of the air cylinder case 62*b*.

Even by the above-mentioned configuration, the same effects as the above-mentioned effects can be obtained.

Hereinabove, while the embodiments of the present invention have been described in detail, it is not limited thereto and it is possible that design changes may also be made without departing from the technical spirit of the present invention.

For example, in the above-mentioned embodiment, while the configuration in which one air cylinder 62 is installed has been described, it is not limited thereto. Two air cylinders 62 may be installed and moving ranges in the up/down direction of the piston rods 62*a* may be set to be different. Here, the piston rod 62*a* of one of the air cylinders 62 is set to be movable upward and downward within a range corresponding to the moving range between the first position P1 and the second position P2 of the moving gear 53. In addition, the pistols rod 62*a* of the other air cylinder 62 is set to be movable upward and downward within a range corresponding to the moving range between the second position P2 and the third position P3 of the moving gear 53. According to the above-mentioned configuration, during starting and stoppage of the turning, only the one air cylinder 62 can be operated and the moving gear 53 can be moved only between the first position P1 and the second position P2. In addition, during stoppage of the turning, only the other air cylinder can be operated and the moving gear 53 can be moved only between the second position P2 and the third position P3. Specifically, when the retreat signal is received, the control device 61 controls the one air cylinder 62 and moves the moving gear 53 to the first position P1. In addition, when the proximity signal is received, the control device 61 controls the one air cylinder 62 and moves the moving gear 53 to the second position P2. Further, in the example, the adhesion prevention signal has a first adhesion prevention signal and a second adhesion prevention signal. When the first adhesion prevention signal is received, the control device 61 controls the other air cylinder 62 and moves the moving gear 53 to the third position P3. In addition, when the second adhesion prevention signal is received, the control device 61 controls the other air cylinder 62 and moves the moving gear 53 to the second position P2.

According to the above-mentioned configuration, the control device 61 may control one of the air cylinders 62 corresponding to each signal and the control can be more simplified than the control of varying strokes of the air cylinders 62 depending on the signals.

In addition, in the above-mentioned embodiment, while the configuration including the air cylinder 62 driven by the driving air has been described, it is not limited thereto. For example, a hydraulic cylinder or the like may be provided instead of the air cylinder.

INDUSTRIAL APPLICABILITY

According to the above-mentioned turning apparatus, attached substances can be suppressed from being adhered to the moving gear, the movement mechanism, or the like, during stoppage of the turning apparatus. Accordingly, since a frequency of cleaning of the turning apparatus or replacement of parts due to adhesion of the attached substances can be decreased, an increase in workload or costs applied to maintenance of the turning apparatus can be suppressed.

REFERENCE SIGNS LIST

11 Turbine rotor (rotor)
12 Wheel gear
13 Revolution number measurement instrument
30 Turning apparatus
31 Casing
40 Power unit
41 Electric motor
42 Speed reducer
43 Output shaft
50 Power transmission unit
51 Output gear
52 Connecting gear
53 Moving gear
60 Movement mechanism
61 Control device
62 Air cylinder
62*a* Piston rod
62*b* Air cylinder case
64 Lever
65 Support section
66 Movement rod
67 Bracket
68 Mechanical stopper
68*a* First mechanical stopper (mechanical stopper)
68*b* Second mechanical stopper (mechanical stopper)
68*c* Third mechanical stopper (mechanical stopper)
69 Proximity switch
69*a* First proximity switch (first position detection)
69*b* Second proximity switch (second position detection)

The invention claimed is:

1. A turning apparatus that is disposed at one end of a rotor and performs turning of the rotor, the turning apparatus comprising:
    an electric motor;
    a moving gear that is movable between a first position at which rotation of an output shaft of the electric motor is able to be transmitted to the rotor so that the turning of the rotor is performed, and a second position and a third position, which are different from each other, at which rotation of the output shaft is unable to be transmitted to the rotor;
    a movement mechanism configured to move the moving gear between the first position, the second position and the third position;
    a device that is configured to generate a retreat signal when the moving gear is disposed at the first position, and the turning is terminated;

a device that is configured to generate an adhesion prevention signal when an elapsed predetermined time for which the moving gear has been disposed at the second position during stoppage of the turning is detected; and a control device configured to control the movement mechanism upon receiving the retreat signal such that the moving gear is moved from the first position to the second position and control the movement mechanism upon receiving the adhesion prevention signal such that the moving gear reciprocates between the second position and the third position.

2. The turning apparatus according to claim 1, wherein the third position is disposed between the first position and the second position.

3. The turning apparatus according to claim 1, wherein the device that is configured to generate the adhesion prevention signal includes a timer that is configured to detect the elapsed predetermined time.

* * * * *